United States Patent
Cardonha et al.

(10) Patent No.: US 9,986,405 B1
(45) Date of Patent: May 29, 2018

(54) CONTEXT-DEPENDENT EMERGENCY SITUATION REPORT

(71) Applicant: International Business Machines Corporation, Armonk, NY (US)

(72) Inventors: Carlos Henrique Cardonha, Sao Paulo (BR); Marcelo Carpinette Grave, Sao Paulo (BR); Fabiano Marcon de Moraes, Sao Paulo (BR); Debora Lina Nascimento Ciriaco Pereira, Sao Paulo (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days. days.

(21) Appl. No.: 15/460,528

(22) Filed: Mar. 16, 2017

(51) Int. Cl.
*H04W 4/22* (2009.01)
*H04W 4/00* (2018.01)
*H04B 1/3827* (2015.01)
*G08B 21/04* (2006.01)

(52) U.S. Cl.
CPC .......... *H04W 4/22* (2013.01); *G08B 21/0453* (2013.01); *H04B 1/385* (2013.01); *H04W 4/005* (2013.01)

(58) Field of Classification Search
CPC .......... G07C 5/008; G06Q 40/08; H04W 4/22
USPC ........................ 455/404.1, 404.2, 418, 456.1
See application file for complete search history.

(56) References Cited

U.S. PATENT DOCUMENTS

| | | | |
|---|---|---|---|
| 8,013,730 B2 | 9/2011 | Oh et al. | |
| 8,013,734 B2 | 9/2011 | Saigh et al. | |
| 8,489,065 B2 | 7/2013 | Green et al. | |
| 9,418,354 B2 | 8/2016 | de Assuncao et al. | |
| 9,531,861 B2 | 12/2016 | Kim et al. | |
| 2002/0145522 A1 | 10/2002 | Pembroke | |
| 2005/0085215 A1 | 4/2005 | Kokko et al. | |
| 2008/0284587 A1 | 11/2008 | Saigh et al. | |
| 2009/0322513 A1 | 12/2009 | Hwang et al. | |
| 2010/0142715 A1* | 6/2010 | Goldstein | G06F 17/30743 381/56 |

(Continued)

FOREIGN PATENT DOCUMENTS

| | | |
|---|---|---|
| CN | 1399938 | 3/2003 |
| CN | 101848291 | 9/2010 |

(Continued)

OTHER PUBLICATIONS

NIST, The NIST Definition of Cloud Computing. Special Publication 800-145. Sep. 2011, pp. 1-7.

(Continued)

*Primary Examiner* — Sam Bhattacharya
(74) *Attorney, Agent, or Firm* — Louis J. Percello; Otterstedt, Ellenbogen & Kammer, LLP

(57) ABSTRACT

A method for context-dependent emergency reporting includes receiving at a processor of a cellular phone a signal indicative of detecting a contextual cue. The exemplary method also includes receiving at the processor of the cellular phone a signal indicative of detecting a confirmatory cue. The exemplary method further includes the processor of the cellular phone identifying an emergency in response to detecting both the confirmatory cue and the contextual cue; and, in response to identifying the emergency, the processor of the cellular phone alerting a pre-registered recipient of the emergency via a wireless communication module of the cellular phone.

20 Claims, 10 Drawing Sheets

(56) References Cited

U.S. PATENT DOCUMENTS

| | | | |
|---|---|---|---|
| 2012/0282887 A1 | 11/2012 | Khoo et al. | |
| 2015/0084757 A1* | 3/2015 | Annibale | G08B 25/10 340/436 |
| 2015/0099480 A1* | 4/2015 | Reiter | H04M 1/72577 455/404.1 |
| 2015/0302425 A1 | 10/2015 | Borger et al. | |
| 2015/0324871 A1 | 11/2015 | Beloglazov et al. | |
| 2015/0348407 A1 | 12/2015 | Avegliano et al. | |
| 2015/0366518 A1* | 12/2015 | Sampson | A61B 5/7221 600/301 |
| 2017/0118789 A1* | 4/2017 | Lee | H04W 76/025 |

FOREIGN PATENT DOCUMENTS

| | | |
|---|---|---|
| CN | 202472862 | 10/2012 |
| CN | 102932526 | 2/2013 |
| DE | 19729645 | 1/1999 |
| DE | 10238805 | 3/2004 |
| EP | 1093317 | 4/2001 |
| JP | 2002223322 | 8/2002 |
| JP | 2003060753 | 2/2003 |
| JP | 2006227831 | 8/2006 |
| JP | 2008242824 | 10/2008 |
| WO | 2014046479 | 3/2014 |

OTHER PUBLICATIONS

Carlos Cardonha, "A Crowdsourcing Platform for the Construction of Accessibility Maps", W4A2013—Communication Paper (May 2013) Rio de Janeiro, Brazil, p. 1-4.

Diego S. Gallo et al., "Taxonomy of Citizen Sensing for Intelligent Urban Infrastructures", IEEE Sensors Journal (Dec. 2014) pp. 4154-4164, v. 14(12).

Fernando Koch et al., "A Platform for Citizen Sensing in Sentient Cities", CitiSens 2012 (2013) pp. 57-66, Springer-Verlag Berlin Heidelberg.

Kelly Shigeno et al., "Citizen Sensing for Collaborative Construction of Accessibility Maps", W4A2013—The Paciello Group Challenge (May 2013) Rio de Janeiro, Brazil, pp. 1-2.

* cited by examiner

CONTEXT-DEPENDENT EMERGENCY SITUATION REPORT

BACKGROUND

The present invention relates to the electrical, electronic and computer arts, and, more particularly, to cellular phones and the like.

Cellular phones can be used for reporting emergency situations, e.g. via calling 911 in the United States or similar emergency numbers in other countries. Emergency reporting can be automated to some extent, e.g. by programming a cellular phone to detect the occurrence of a pre-registered event such as movement outside of a defined safe area. Emergency reporting also can be linked to a single gesture such as actuation of a push button, rather than requiring a complete dialing sequence.

SUMMARY

Principles of the invention provide techniques for context-dependent emergency reporting. In one aspect, an exemplary method includes receiving at a processor of a cellular phone a signal indicative of detecting a contextual cue. The exemplary method also includes receiving at the processor of the cellular phone a signal indicative of detecting a confirmatory cue. The exemplary method further includes the processor of the cellular phone identifying an emergency in response to detecting both the confirmatory cue and the contextual cue; and, in response to identifying the emergency, the processor of the cellular phone alerting a pre-registered recipient of the emergency via a wireless communication module of the cellular phone.

An exemplary embodiment of the invention may be an apparatus that includes a processor coupled in communication with first and second sensors; a wireless communication module coupled in communication with the processor; and a memory coupled in communication with the processor. The memory may embody distinct software modules that comprise a contextual module a confirmatory module and an alarm module. The processor is configured to receive a signal from the first sensor, to compare the signal from the first sensor to values stored in the memory, to trigger a signal indicative of detecting a contextual cue in response to the signal from the first sensor matching a corresponding stored value within a corresponding accuracy, to receive a signal from the second sensor, to compare the signal from the second sensor to template sequences stored in the memory, and to trigger a signal indicative of detecting a confirmatory cue in response to the signal from the second sensor matching a corresponding template sequence. The contextual module executes on the processor to facilitate receiving the signal from the first sensor and triggering the signal indicative of detecting the contextual cue. The confirmatory module executes on the processor to facilitate receiving the signal from the second sensor, triggering the signal indicative of detecting the confirmatory cue by the second sensor, and identifying an emergency in response to detecting both the confirmatory cue and the contextual cue. The alarm module executes on the processor to facilitate alerting a pre-registered recipient of the emergency, via the wireless communication module, in response to identifying the emergency.

An exemplary computer program product may comprise a computer readable storage medium embodying computer executable instructions which when executed by a cellular phone cause the cellular phone to facilitate any of the methods above discussed.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

Easiness and intuitiveness of use, as gestures and their interpretations can be defined by the user; possibility to explore context in order to assign different meanings to the same gesture.

These and other features and advantages of the present invention will become apparent from the following detailed description of illustrative embodiments thereof, which is to be read in connection with the accompanying drawings.

DETAILED DESCRIPTION

Figure 1:
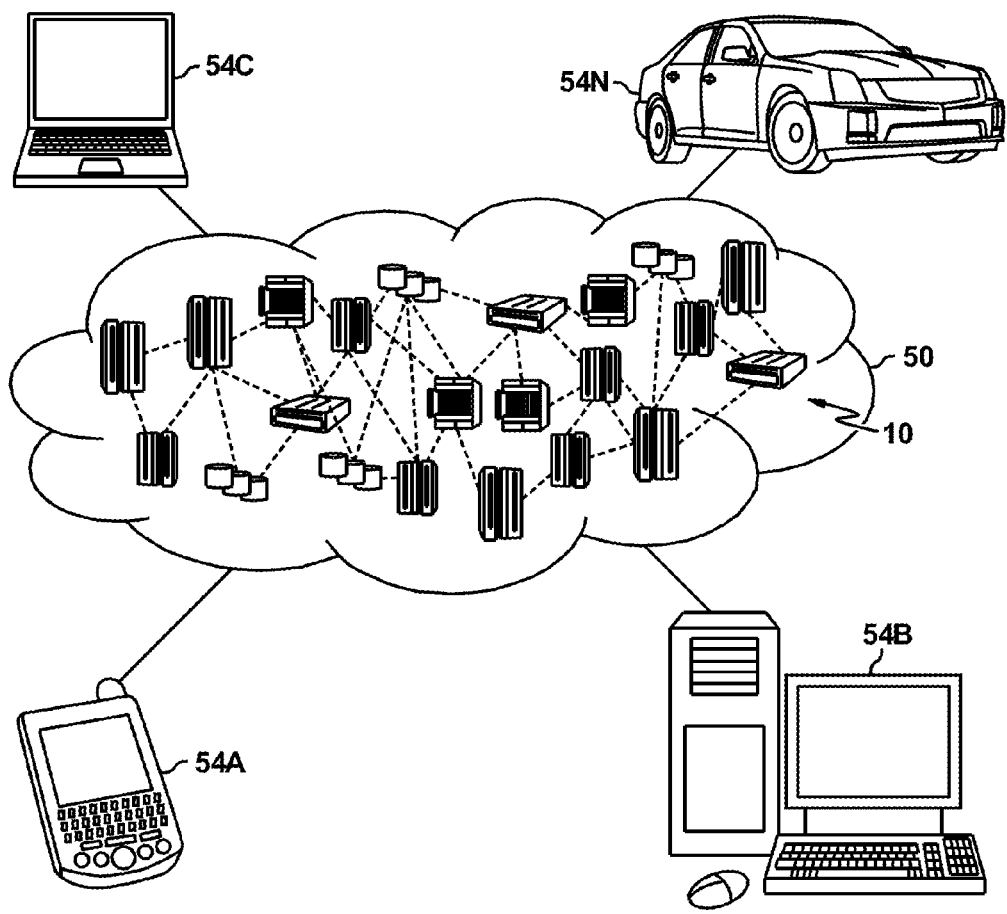
FIG. 1 depicts a cloud computing environment according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
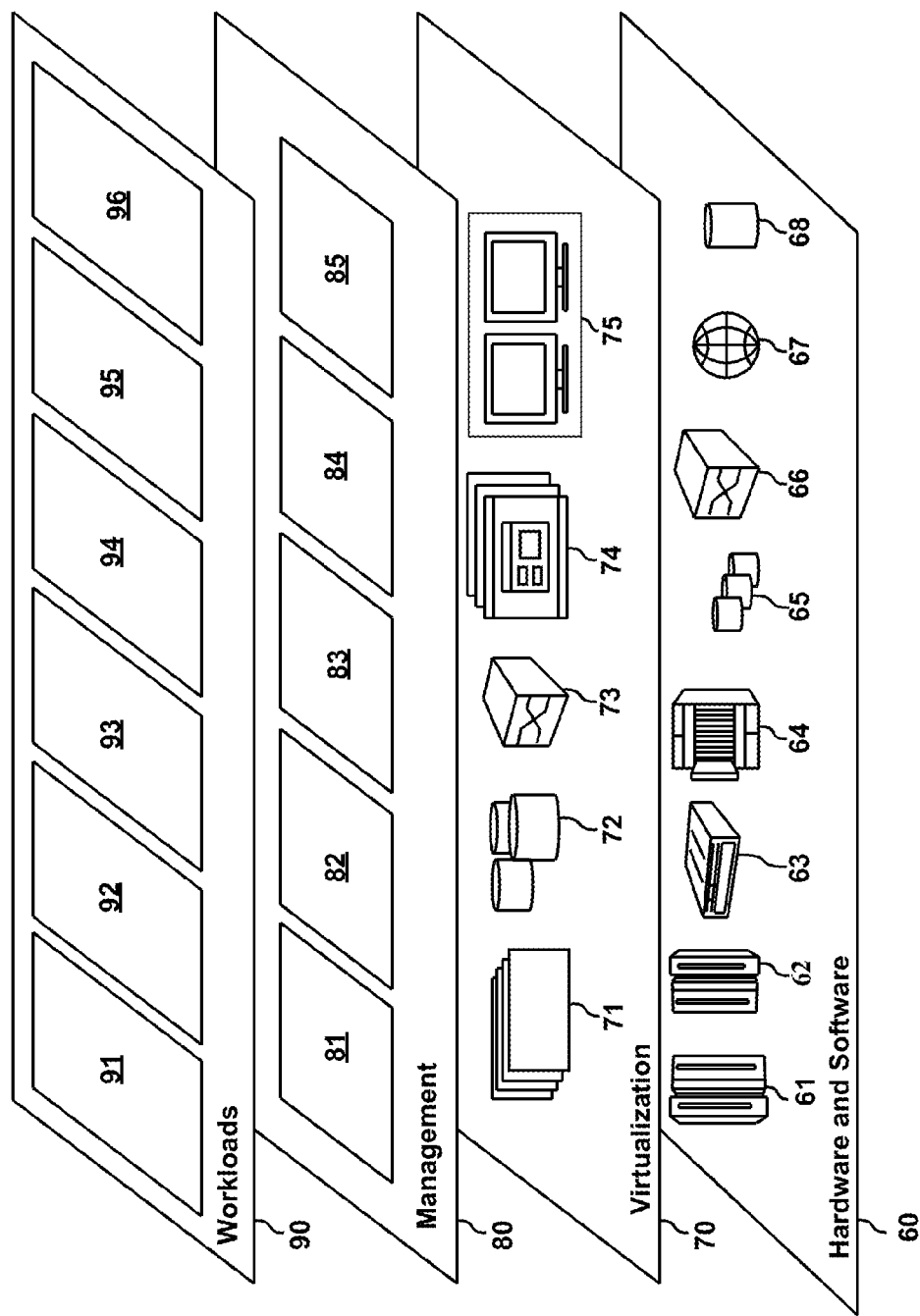
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 50 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and context-dependent emergency situation reporting 96.

Figure 3:
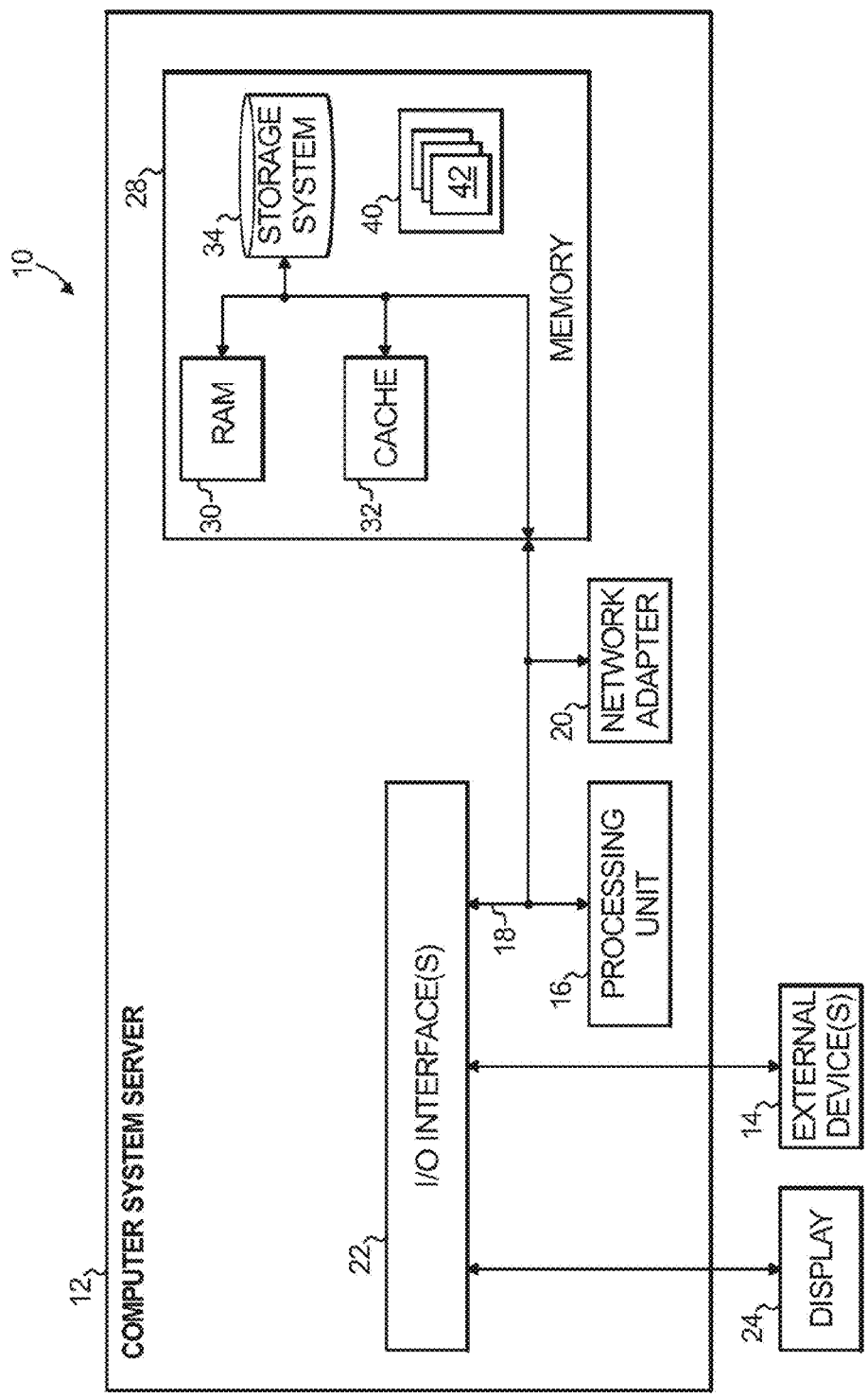
FIG. 3 depicts a computer system (cellular phone) that may be useful in implementing one or more aspects and/or elements of the invention, also representative of a cloud computing node according to an embodiment of the present invention.

FIG. 3 depicts a wirelessly networked computer system (for example, a cellular phone) that may be useful in implementing one or more aspects and/or elements of the invention, also representative of a cloud computing node according to an embodiment of the present invention. Referring now to FIG. 3, the cellular phone 10 is only one example of a suitable cloud computing node and is not intended to suggest any limitation as to the scope of use or functionality of embodiments of the invention described herein. Regardless, cellular phone 10 is capable of being implemented and/or performing any of the functionality set forth hereinabove.

The cellular phone 10 comprises a computer system/server 12, which is operational with numerous other general purpose or special purpose computing system environments or configurations. The computer system/server 12 may be described in the general context of computer system executable instructions, such as program modules, being executed by a computer system. Generally, program modules may include routines, programs, objects, components, logic, data structures, and so on that perform particular tasks or implement particular abstract data types. The computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, the computer system/server 12 in cellular phone 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a removable, non-volatile electronic media (not shown and typically called a "flash drive"). Although not shown, the cellular phone 10 can be connected to an external, non-volatile magnetic media (not shown and typically called a "hard drive") and/or to an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. For the cellular phone 10, the network adapter 20 may incorporate multiple discrete network connectivity modules for implementing communication protocols according to standards such as WiFi™ (a registered trademark of the WiFi Alliance Corporation), Bluetooth™ (a registered trademark of Bluetooth Sig, Inc.), or 4G LTE™ (a registered trademark of Institut Européen des Normes). As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 3, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 3) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text. One or more embodiments of the invention, or elements thereof, can be implemented in the form of an apparatus including a memory and at least one processor that is coupled to the memory and operative to perform exemplary method steps.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

Thus, according to embodiments of the invention the cellular phone 10 is provided for passively detecting an emergency situation and alerting a pre-registered recipient of the emergency situation. Some particular use cases may be helpful in understanding certain aspects of the invention.

Use Case 1:

Consider a passenger travelling on a bus which is composed by two seats side by side. The passenger notices a suspicious action or a weird conversation by their seatmate, which makes the passenger anxious and consider taking action such as reporting the event. A sensor acquiring the passenger's blood oxygen saturation triggers a contextual cue in the passenger's cellular phone. By performing a pre-defined gesture pattern—without removing the phone from the pocket—the passenger then triggers a confirmatory cue. In response to receiving the confirmatory cue concurrent with the contextual cue, the phone alerts a pre-registered user of an emergency situation. For example, the highway patrol barracks may be a pre-registered user.

Use Case 2:

Consider a person in a crowded place. There is an explosion that produces a rapid overpressure situation detectable as a spike of low-frequency sound. The low-frequency sound triggers a contextual cue in the person's cellular phone. In response to receiving this contextual cue, the phone alerts a pre-registered user of an emergency situation. For example, local emergency services may be a pre-registered user. Because notifications are triggered only after a certain user gesture is captured, the invention allows for different interpretations of the same event (e.g., the explosion might be something controlled or it might have been caused by unexpected circumstances).

Use Case 3:

Imagine a person who is in the subway, observed a suspicious action, and would like to warn the subway authorities about it without being noticed. The person's cellular phone detects their location as a contextual cue to a potential dangerous situation. The person who is in a dangerous context then could insert a touch or motion or gesture pattern in their cellular phone as a confirmatory cue. In response to receiving this confirmatory cue, the phone alerts a pre-registered user of an emergency situation. For example, the subway traffic control center may be a pre-registered user.

For each particular use case, it is possible to have a one-button action that performs a relevant task (i.e., a single button to dial emergency services or to alert a family member). A key idea of the invention is that one may have one single solution (i.e., a single user gesture) that addresses all use cases by taking into account context in order to interpret the gesture and trigger the appropriate notification messages. For example, in each use case 1-3, the same confirmatory gesture can be used, but the context (location, sensor type, and sensor value) can be different.

Figure 4:
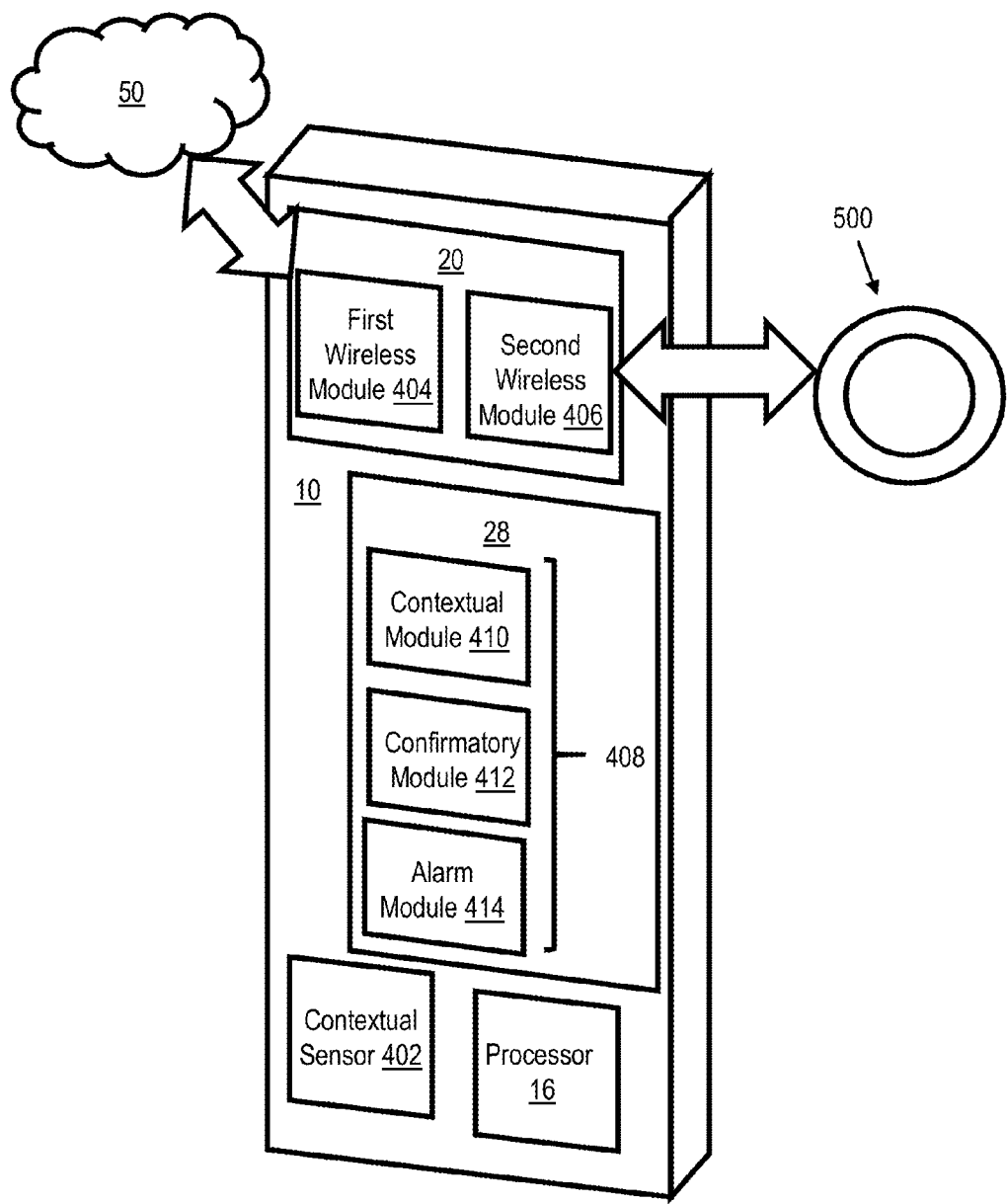
FIG. 4 shows details of a cellular phone configured to implement aspects of the invention.
Figure 5:
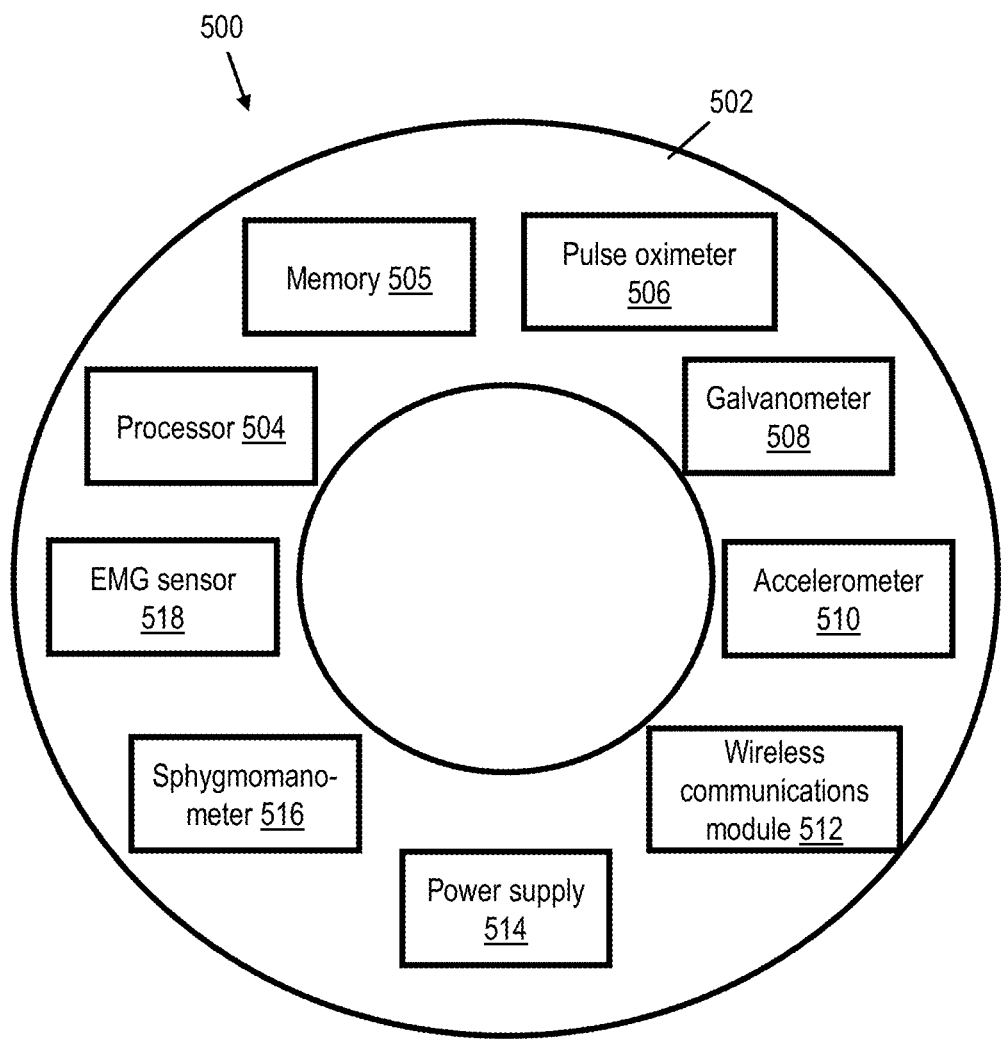
FIG. 5 shows details of a wireless wearable sensor module according to an embodiment of the invention.

Referring to FIG. 4, according to certain embodiments of the invention the cellular phone 10 includes certain additional components that are mutually configured to accomplish at least some of the above use cases. For example, the cellular phone 10 may include a contextual sensor 402 such as a thermometer, a microphone, an accelerometer, a GPS receiver, or a photodiode. The network adapter 20 may include a first wireless communication module 404 and a second wireless communication module 406. The cellular phone 10 is coupled in wireless communication with the cloud computing environment 50 via the first wireless communication module 404, and acts as a cloud computing node. The memory 28 embodies computer executable instructions 408 that comprise a contextual module 410, a confirmatory module 412, and an alarm module 414. Referring also to FIG. 5, according to certain embodiments of the invention the cellular phone 10 is coupled in communication with a wearable sensor module 500 via the second wireless communication module 406.

"Coupled in communication with" a component means connected directly or indirectly so as to be capable of exchanging data with that component, e.g. via parallel or serial bus or via wireless broadcast or point-to-point connectivity, including any intermediate components such as a repeater, router, network hub, or the like.

According to particular embodiments of the invention, the wearable sensor module 500 may be in the form of a ring or bracelet body 502 that houses a processor 504, which is coupled in communication with a memory 505, a pulse oximeter 506, a galvanometer 508, an accelerometer 510 (e.g., a three- or six-axis accelerometer), and a wireless communication module 512. All the components housed in the body 502 are powered by a power supply 514. One exemplary power supply would be a battery; other exemplary power supplies might include a vibration energy harvesting apparatus or a photocell. According to certain embodiments of the invention, the wearable sensor module 500 also may include a sphygmomanometer 516 (e.g., a "cuffless" sphygmomanometer such as a radar-based or ultrasound sphygmomanometer) as well as an electromyography sensor 518.

The various sensors of the wearable sensor module 500 can provide contextual or confirmatory cues as follows. The pulse oximeter 506 can detect changes in blood oxygen saturation and pulse rate. An accelerated pulse rate combined with a drop in blood oxygen saturation can be indicative of a stressful situation. Similarly, the galvanometer 508 can detect changes in skin conductivity, which can be indicative of a stressful situation. The accelerometer 510 can detect movements of a user's limb or hand, which can be matched to a confirmatory gesture pattern. The sphygmomanometer 516 can detect increase or decrease in blood pressure, where increased blood pressure can be indicative of a stressful situation or pain and decreased blood pressure can be indicative of serious physical injury. The electromyography sensor 518 can detect muscle movements (i.e. twitches or small gestures), which can be matched to a confirmatory gesture pattern.

In operation, the processor 504 is coupled in wireless communication with the processor 16 of the cellular phone 10 via the wireless communication module 512 and the second wireless communication module 406. The processor 504 thereby may couple the other components of the wearable sensor module in communication with the processor 16 of the cellular phone 10, so that according to certain embodiments the cellular phone 10 can directly receive the measurements produced by the wearable sensor module 500. According to other embodiments, the processor 504 may pre-process measurements produced by the wearable sensor module 500, and may send the processor 16 summary signals indicative of those measurements—e.g., a signal indicative of detecting a contextual cue, and a signal indicative of detecting a confirmatory cue, as further discussed below with reference to FIG. 6.

In operation, the contextual sensor 402 produces measurements of temperatures, sound levels, accelerations and/or ambient light levels at the cellular phone 10. At the wearable sensor module 500, the pulse oximeter 506 produces measurements of blood oxygen saturation and heart rate. The galvanometer 508 produces measurements of skin conductance. The accelerometer 510 produces measurements of the wearable item's accelerations, which can be integrated in the processors 504 or 16 to obtain velocities and positions over time. The sphygmomanometer 516 produces measurements of blood pressure, while the electromyography sensor 518 produces measurements of nerve impulses related to muscle contraction and relaxation.

According to certain embodiments, the processor 504 receives the measurements from the various meters of the wearable sensor module 500 and compares the measured values to threshold values or template sequences stored in the memory 505. In response to any of the measured physiologic values exceeding a corresponding threshold value, the processor 504 generates or triggers a signal indicative of detecting a contextual cue and sends that signal to the processor 16 of the cellular phone 10. Thus, the processor 16 of the cellular phone 10 receives a signal indicative of detecting a contextual cue. In response to a measured sequence of positions or nerve impulses matching a user-defined template sequence of positions or nerve impulses (i.e., a sequence of positions or nerve impulses recorded in the memory 505 concomitant with a user rehearsing an emergency alert gesture), the processor 504 generates or triggers a signal indicative of detecting a confirmatory cue and sends that signal to the processor 16 of the cellular phone 10. Thus, the processor 16 of the cellular phone 10 receives a signal indicative of detecting a confirmatory cue.

According to certain other embodiments, the processor 504 receives and multiplexes the various measurement signals produced by the various meters of the wearable sensor module 500, and communicates the multiplexed signals to the processor 16 of the cellular phone 10. The processor 16 then de-multiplexes and compares the measurement signals to threshold values or template sequences stored in the cellular phone memory 28. In response to any of the measured physiologic values exceeding a corresponding threshold value, the processor 16 generates or triggers a signal indicative of detecting a contextual cue, and receives the signal it generates. In response to a measured sequence of positions or nerve impulses matching a user-defined template sequence of positions or nerve impulses (i.e., a sequence of positions or nerve impulses recorded in the memory 28 concomitant with a user rehearsing an emergency alert gesture), the processor 16 generates or triggers a signal indicative of detecting a confirmatory cue, and receives the signal it generates.

Thus, according to certain aspects of the invention, the measurements provided by the wearable sensor module 500 may serve as contextual cues to an emergency situation. For example, the user's physiologic signs (blood oxygen saturation, heart rate, skin conductance, blood pressure) may be used as proxies of a dangerous situation, i.e. as contextual cues. Similarly, sudden acceleration of the wearable sensor module 500 may serve as a contextual cue of a traffic accident or the like. On the other hand, the measurements provided by the wearable sensor module 500 may serve as confirmatory cues of an emergency situation in case the cellular phone onboard sensors already have detected contextual cue(s) of an emergency situation. For example, accelerations of the wearable sensor module 500 in a particular pre-defined pattern, or detection of a particular pre-defined pattern of muscle contractions and relaxations, may serve as a user-input confirmatory cue of an emergency situation.

During operation of the cellular phone 10, the processor 16 continually executes the computer executable instructions 408 in the background, i.e. non-interactively without obtruding on a user of the cellular phone. Execution of the computer executable instructions 408 causes the cellular phone to passively monitor the contextual sensor 402 for a contextual cue of an emergency situation, and to passively monitor the second wireless communication module 406 for a confirmatory cue of the emergency situation.

Figure 6:
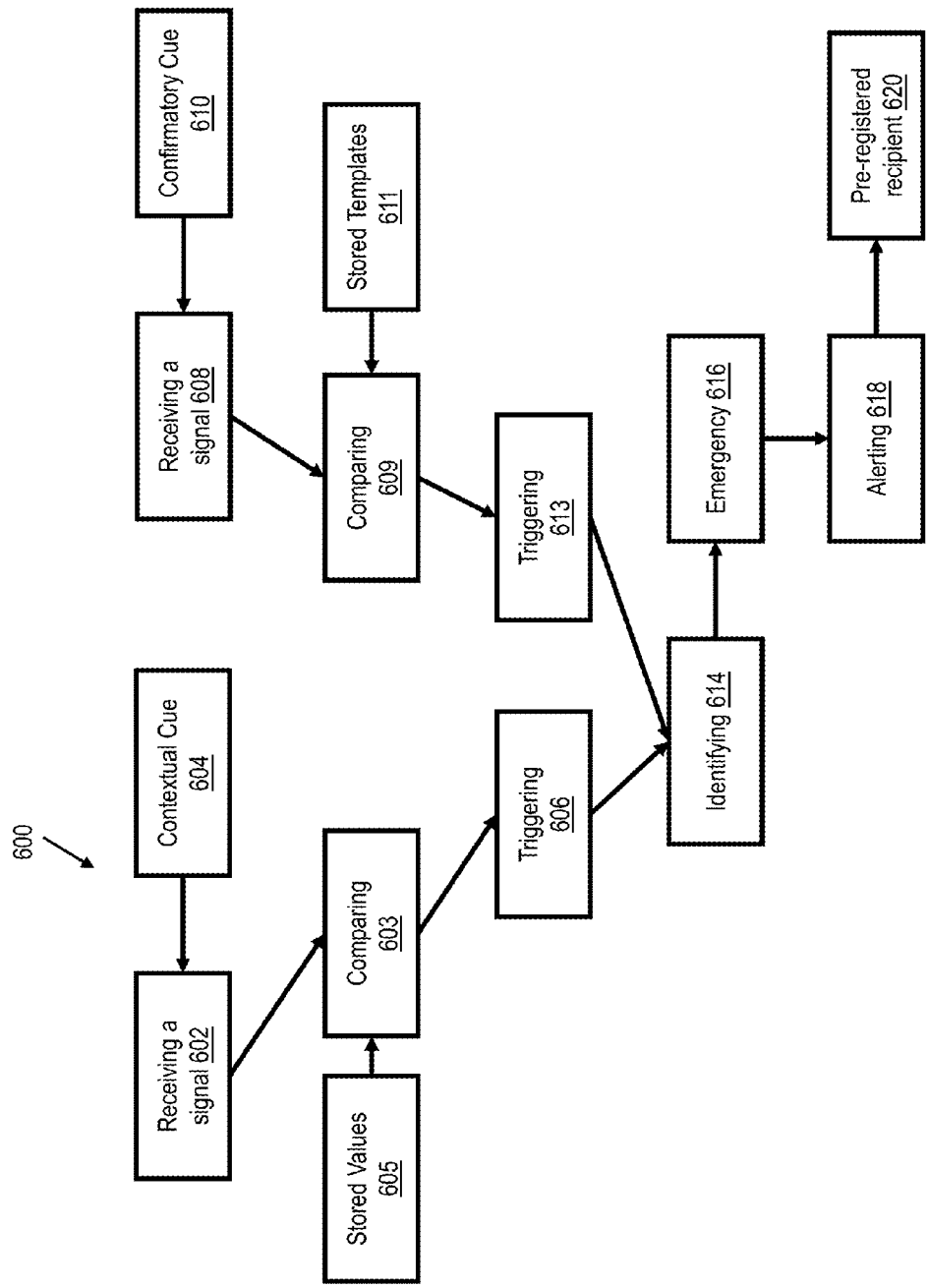
FIG. 6 is a flowchart of method steps according to an aspect of the invention.

Referring to FIG. 6, when the processor 16 executes the computer executable instructions 408 it causes the cellular phone to facilitate a method 600. As part of the method 600, execution of the contextual module 410 causes the cellular phone 10 to passively monitor the contextual sensor 402 and/or the wearable sensor module 500 until receiving 602 a signal indicative of detecting a contextual cue 604. As another part of the method 600, execution of the confirmatory module 412 causes the cellular phone 10 to passively monitor the wearable sensor module 500 until receiving 608 a signal indicative of detecting a confirmatory cue 610. In response to detecting 608 the confirmatory cue 610 and detecting 602 the contextual cue 604, the cellular phone 10 identifies 614 an emergency 616. The emergency 616 may be identified by setting a software flag, triggering a software event, or by other means apparent to the ordinary skilled worker. As another part of the method 600, execution of the alarm module 414 configures the processor 16 so that, in response to identifying the emergency 616, the cellular phone 10 alerts 618, via the first wireless communication module 404, a pre-registered recipient 620. For example, the pre-registered recipient 620 may be local emergency services, a relative of the cellular phone user, or another individual or entity pre-registered by the cellular phone user.

As one example of operation, an increase of ambient sound level above a first threshold may cause the cellular phone processor 16 to trigger a signal indicative of detecting a contextual cue, while rapid increase of ambient sound level, at a rate above a second threshold, may cause the cellular phone processor 16 to trigger a signal indicative of detecting a confirmatory cue, causing the cellular phone 10 to identify an emergency. Similarly, an increase of ambient temperature above a first threshold may cause the cellular phone processor 16 to trigger a signal indicative of detecting a contextual cue, while further increase of ambient temperature above a second threshold that is higher than the first threshold may cause the cellular phone processor 16 to trigger a signal indicative of detecting a confirmatory cue, causing the cellular phone 10 to identify an emergency. As another example, an increase in pulse rate of the wearer of the wearable sensor module 500 may cause the wearable sensor module processor 504 to trigger a signal indicative of detecting a contextual cue, while an increase of skin conductance combined with a decrease in blood oxygen saturation may cause the wearable sensor module processor 504 to trigger a signal indicative of detecting a confirmatory cue, causing the cellular phone 10 to identify an emergency situation. In further embodiments, performance of a pre-defined gesture by the wearer of the wearable sensor module 500 may cause the wearable sensor module processor 504 or the cellular phone processor 16 to trigger a signal indicative of detecting a confirmatory cue, causing the cellular phone 10 to identify an emergency.

According to certain embodiments, different pre-registered recipients may be notified according to the nature of an emergency. For example, in case physiological cues and a confirmatory gesture indicate an imminent robbery, local police may be contacted. On the other hand, in case contextual cues such as temperature indicate a fire in progress, local fire department may be contacted.

Figure 7:
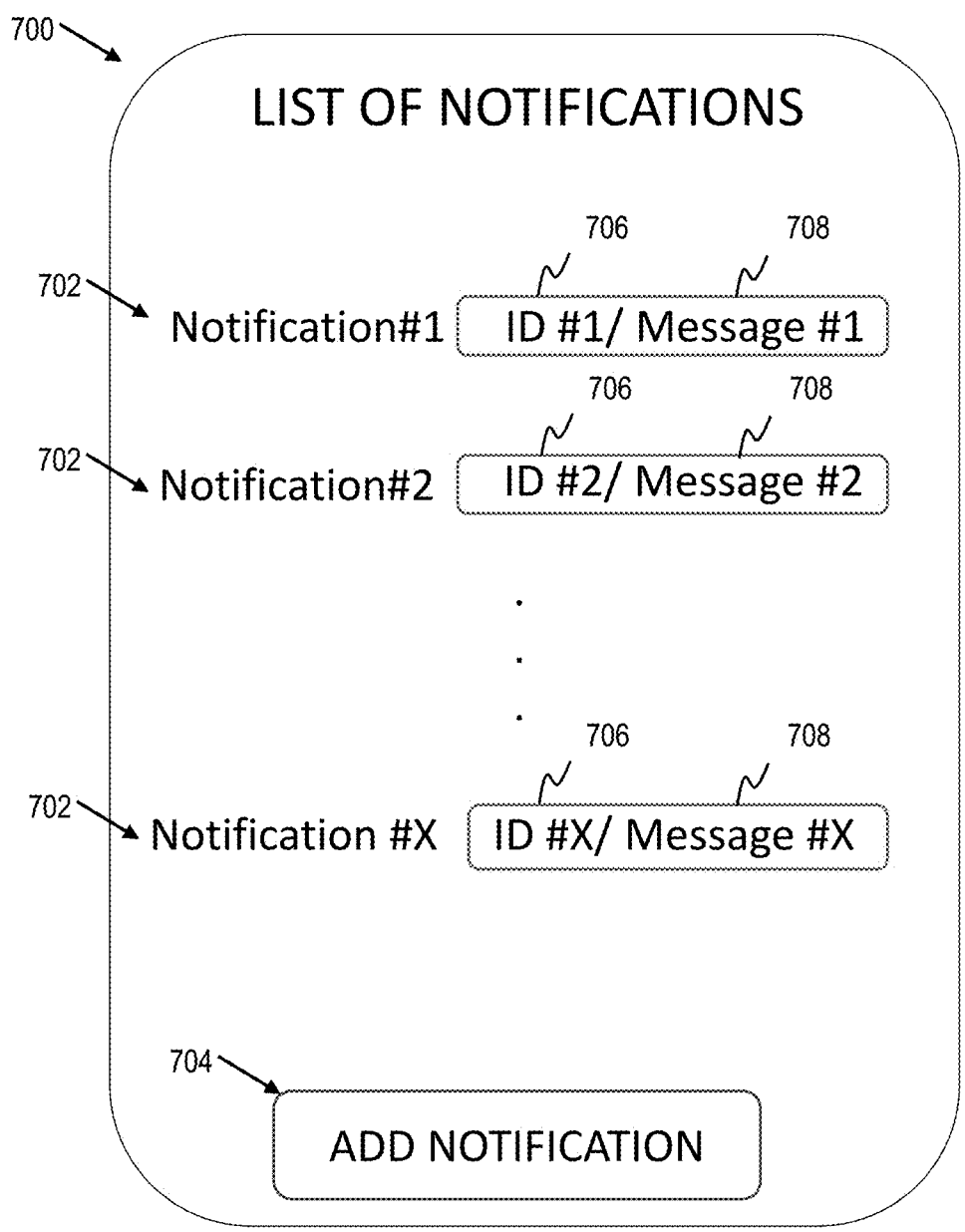
FIG. 7 is a screenshot of a LIST OF NOTIFICATIONS screen according to an aspect of the invention.

The invention may be provided as an application or app for use on a cellular phone. When a user opens the application the first screen that will be seen is a list 700 of notifications 702, as shown in FIG. 7. The list 700 includes a button 704 for adding a notification to the list. Each notification 702 has an associated ID 706 and one or more messages 708. The ID 706 is a unique number, for instance, a timestamp+IMEI (IMEI=International Mobile Equipment Identity) which will identify each notification when it is needed as well, as the message 708 associated with that ID.

Figure 8:
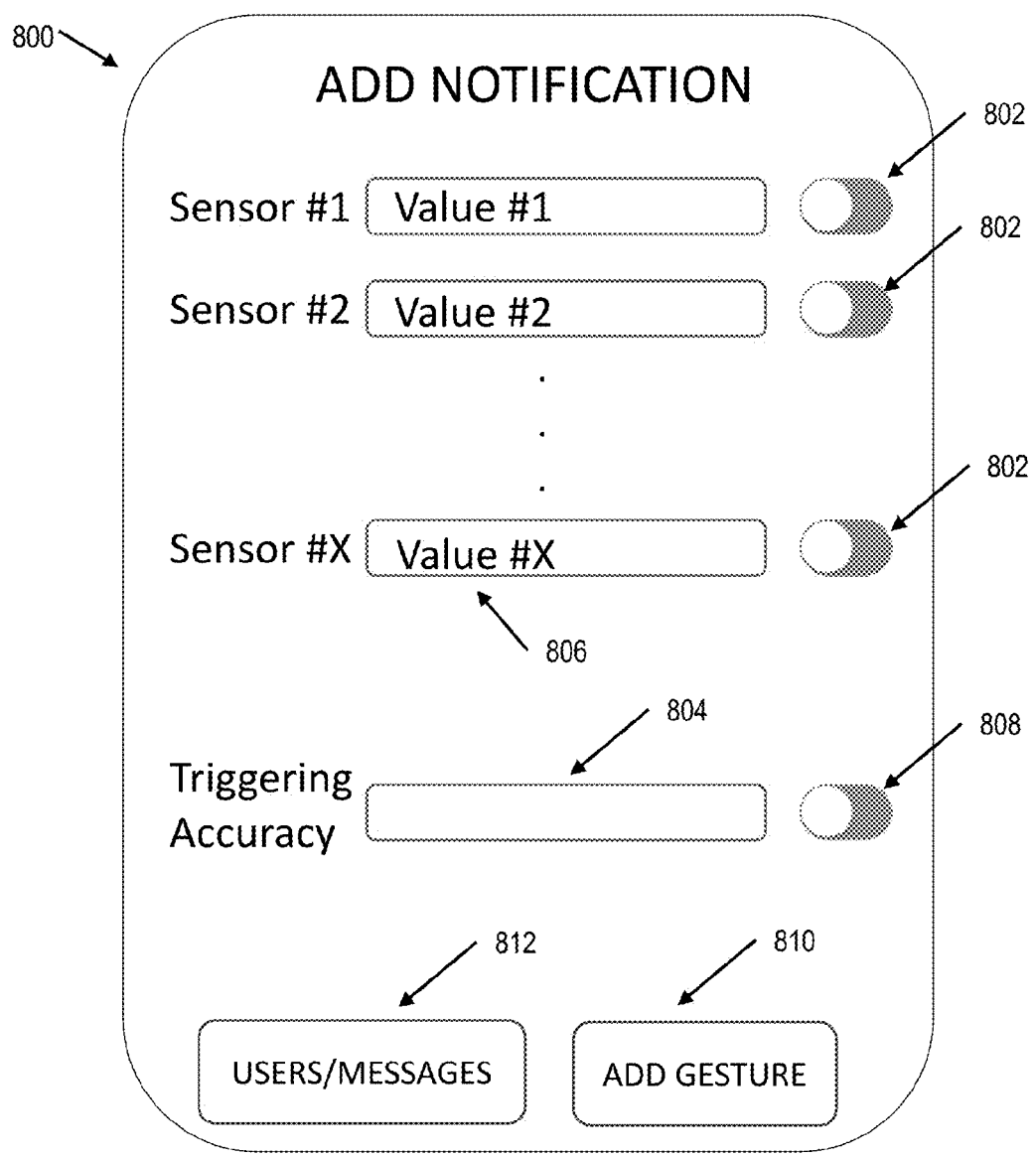
FIG. 8 is a screenshot of an ADD NOTIFICATION screen according to an aspect of the invention.

Referring to FIG. 8, the add notification button 704 opens an ADD NOTIFICATION screen 800. When a user clicks on ADD NOTIFICATION 704, the user will be able to add a new notification 702, activate/configure sensors and reference values, include gestures pattern and so on. At the add notification screen 800, each installed sensor can be either activated or not by using an ON/OFF button or switch 802 on the right-hand side of the screen. Not all sensors need to be used for any specific notification. The add notification screen 800 also provides for a user to set a triggering accuracy 804, which is a number between 0-1. For instance, if a sensor reference value 806 is set to 10 and accuracy is 0.9, the triggering sensor value will be within a range between 9-11. When the triggering accuracy switch 808 is set to OFF, that means the default will be used, for instance, 0.9.

Figure 9:
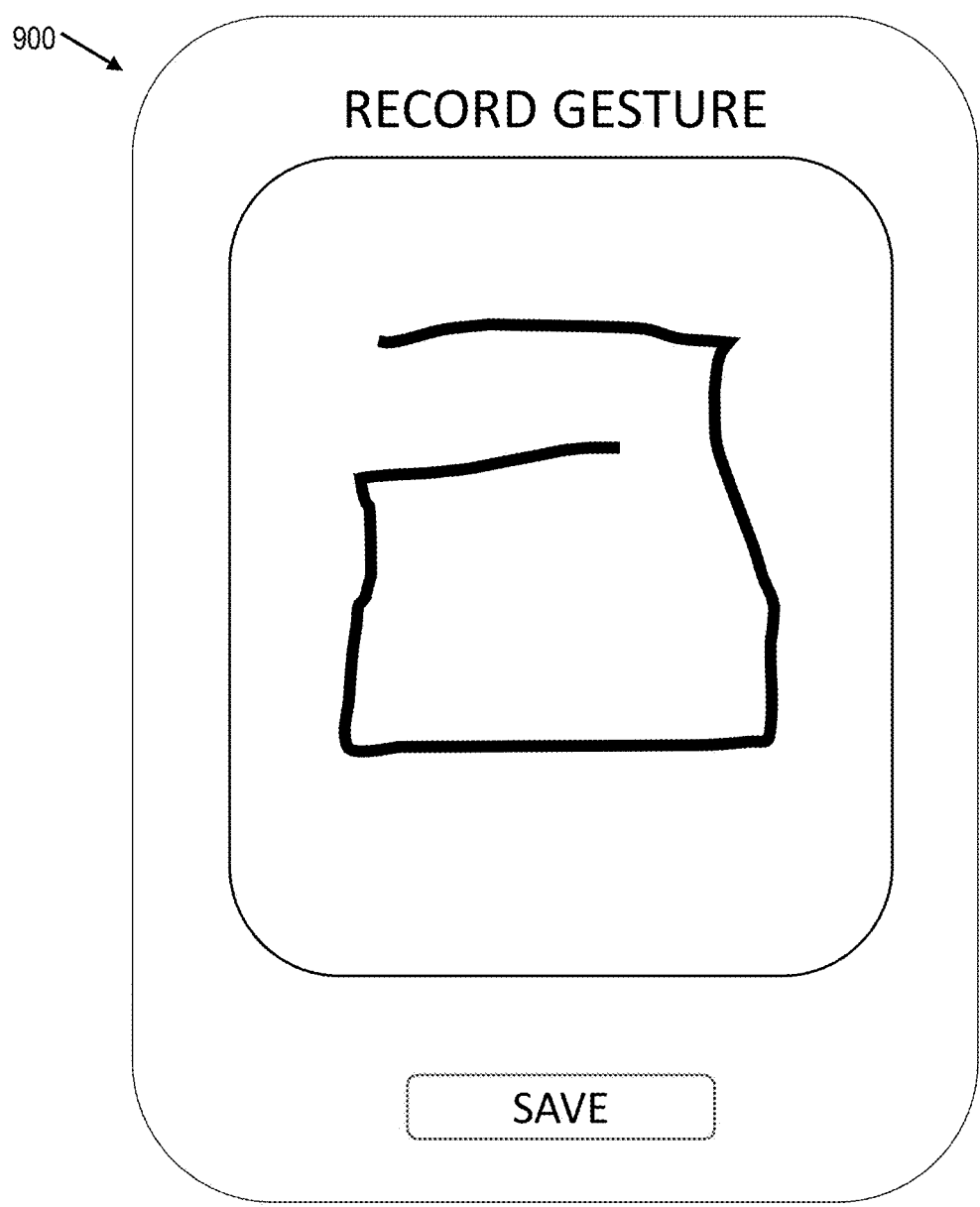
FIG. 9 is a screenshot of a RECORD GESTURE screen according to an aspect of the invention.
Figure 10:
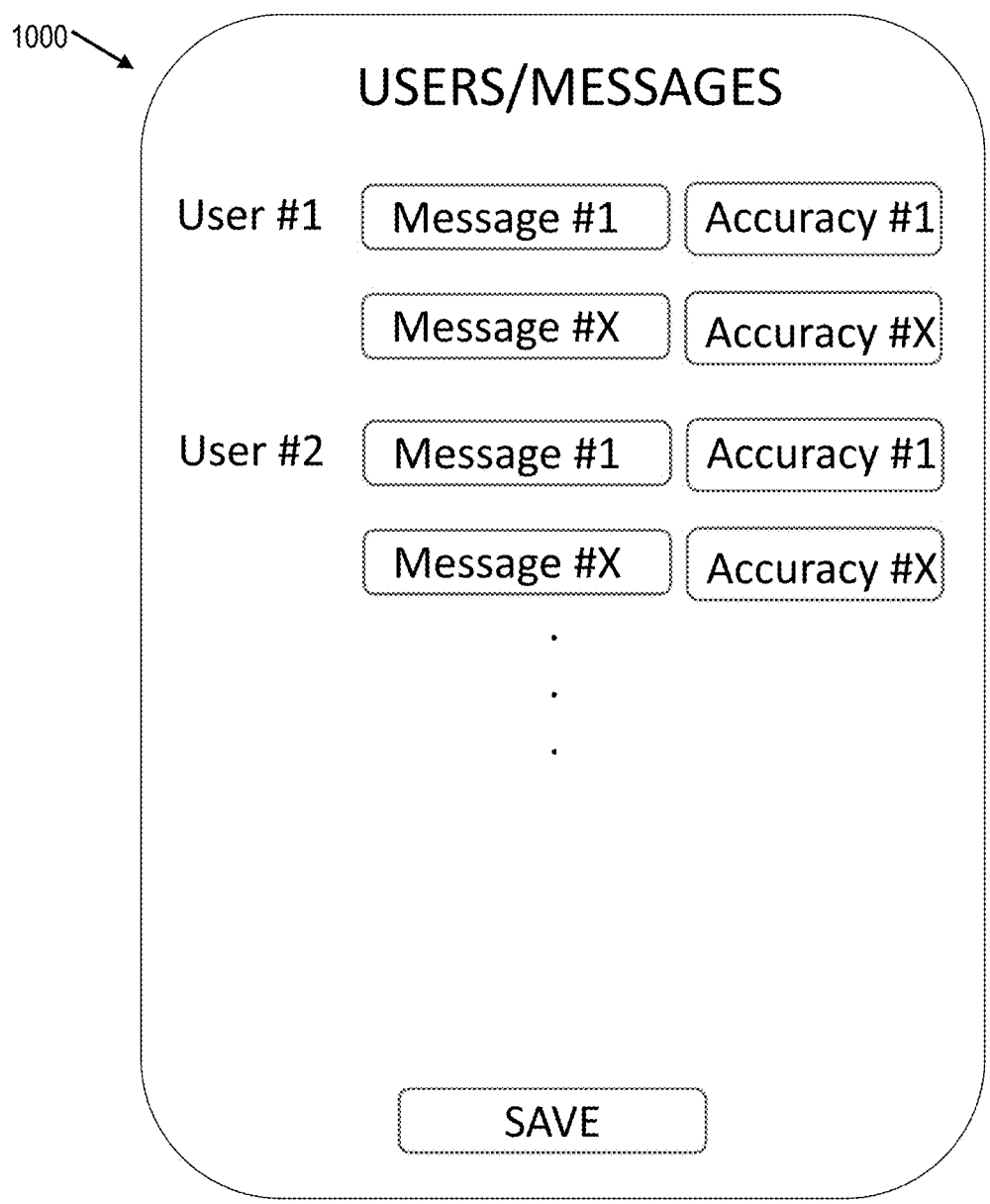
FIG. 10 is a screenshot of a USERS/MESSAGES screen according to an aspect of the invention.

At the add notification screen 800, an ADD GESTURE button 810 leads the user to enroll a pattern for the new notification on a RECORD GESTURE screen 900, shown in FIG. 9. A USERS/MESSAGES button 812 leads the user to a USERS/MESSAGES screen 1000, as shown in FIG. 10. At the USERS/MESSAGES screen 1000, each notification message can be sent to more than one user according to the accuracy of the notification. For example, according to a first case A, the system was triggered with accuracy 1 which means all sensors values are exactly the number the user has been set, this means an extremely precise warning message, for instance, "I AM IN DANGER!! PLEASE HELP ME". On the other hand, according to another case B, suppose the system was triggered with accuracy 0.7 which means all sensors values are not so precise, this means a not so precise warning message, for instance, "I am probably in trouble, please check this out".

Given the discussion thus far, and referring to the drawing Figures, it will be appreciated that, in general terms, an exemplary method, according to an aspect of the invention, includes receiving 602 at a processor 16 of a cellular phone 10 a signal indicative of detecting a contextual cue 604. The exemplary method also includes receiving at the processor of the cellular phone a signal 608 indicative of detecting a confirmatory cue 610. The exemplary method further includes the processor of the cellular phone identifying 614 an emergency in response to detecting both the confirmatory cue and the contextual cue; and, in response to identifying the emergency, the processor of the cellular phone alerting 618 a pre-registered recipient of the emergency via a wireless communication module 404 of the cellular phone.

According to certain implementations of the exemplary method, the contextual cue may be a sound level. Alternatively, the contextual cue may be a rate of change of a sound level. Alternatively, the contextual cue may be a temperature. Alternatively, the contextual cue may be a physiologic cue of a user of the cellular phone. For example, the contextual cue may be detected by a pulse oximeter or by a galvanometer.

According to certain implementations of the exemplary method, the confirmatory cue may be a gesture made by a user of the cellular phone. For example, the confirmatory cue may be detected by a sensor of a wearable item worn by the user of the cellular phone.

Certain implementations of the exemplary method may include providing distinct software modules, each of the distinct software modules being embodied on a computer-readable storage medium of the cellular phone, and the distinct software modules comprising a contextual module, a confirmatory module, and an alarm module. The contextual module 410 may execute on the cellular phone to facilitate receiving a signal indicative of detecting a contextual cue; the confirmatory module 412 may execute on the cellular phone to facilitate receiving a signal indicative of detecting a confirmatory cue and to facilitate identifying an emergency in response to detecting both the confirmatory cue and the contextual cue; and the alarm module 414 may execute on the cellular phone to facilitate alerting the pre-registered recipient in response to identifying the emergency.

Certain implementations of the exemplary method may include pre-registering the pre-registered recipient of the alert.

An exemplary embodiment of the invention may be an apparatus 10 that includes a processor 16 coupled in communication with first and second sensors (e.g., any of 506, 508, 510, 516, 518; or a sensor onboard a cellular phone); a wireless communication module (e.g., 404, 406) coupled in communication with the processor; and a memory 28 coupled in communication with the processor. The memory may embody distinct software modules that comprise a contextual module 410, a confirmatory module 412, and an alarm module 414. The processor 16 is configured to receive 602 a signal 604 from the first sensor, to compare 603 the signal from the first sensor to values 605 stored in the memory, to trigger 606 a signal indicative of detecting a contextual cue in response to the signal from the first sensor matching a corresponding stored value within a corresponding accuracy, to receive 608 a signal 610 from the second sensor, to compare 609 the signal 610 from the second sensor to template sequences 611 stored in the memory, and to trigger 613 a signal indicative of detecting a confirmatory cue in response to the signal from the second sensor matching a corresponding template sequence. The contextual module 410 executes on the processor 16 to facilitate receiving the signal from the first sensor and triggering the signal indicative of detecting the contextual cue. The confirmatory module 412 executes on the processor to facilitate receiving the signal from the second sensor, triggering the signal indicative of detecting the confirmatory cue by the second sensor, and identifying an emergency in response to detecting both the confirmatory cue and the contextual cue. The alarm module 414 executes on the processor to facilitate alerting a pre-registered recipient of the emergency, via the wireless communication module, in response to identifying the emergency.

Certain embodiments of the exemplary apparatus include the first sensor, which may be a thermometer, a microphone, an accelerometer, a GPS receiver, a photodiode, a pulse oximeter, a sphygmomanometer, a galvanometer, and/or an electromyography sensor. For example, the apparatus may include a wearable sensor module to be worn by a user of the apparatus, wherein the first sensor is housed in the wearable sensor module. The apparatus may include a second wireless communication module by which the processor is coupled in communication with the first sensor.

An exemplary computer program product may comprise a computer readable storage medium embodying computer executable instructions which when executed by a cellular phone cause the cellular phone to facilitate any of the methods above discussed.

Additionally, embodiments of the exemplary computer program product may embody computer executable instructions which when executed by the cellular phone cause the cellular phone to facilitate establishing wireless communication with a sensor for detecting one of the contextual cue or the confirmatory cue. Other embodiments of the exemplary computer program product may further embody computer executable instructions which when executed by the cellular phone cause the cellular phone to facilitate pre-registering 812 the pre-registered recipient of the alert. Other embodiments of the exemplary computer program product may further embody computer executable instructions which when executed by the cellular phone cause the cellular phone to facilitate establishing reference values 806 of sensor values corresponding to one or more contextual cues. Yet other embodiments of the exemplary computer program product may further embody computer executable instructions which when executed by the cellular phone cause the cellular phone to facilitate establishing 810 a confirmatory gesture input.

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus comprising:
 a processor coupled in communication with first and second sensors;
 a wireless communication module coupled in communication with the processor; and
 a memory coupled in communication with the processor, the memory embodying distinct software modules that comprise a contextual module, a confirmatory module, and an alarm module, wherein:
 the processor is configured to receive signals from the first sensor and the second sensor, to compare the signal from the first sensor to values stored in the memory, to trigger a signal indicative of detecting a contextual cue in response to the signal from the first sensor matching a corresponding stored value within a corresponding accuracy, to compare the signal from the second sensor to template sequences stored in the memory, and to trigger a signal indicative of detecting a confirmatory cue in response to the signal from the second sensor matching a corresponding template sequence;
 the contextual module executes on the processor to facilitate receiving the signal from the first sensor and triggering the signal indicative of detecting the contextual cue;
 the confirmatory module executes on the processor to facilitate receiving the signal from the second sensor, triggering the signal indicative of detecting the confirmatory cue by the second sensor, and identifying an emergency in response to detecting both the confirmatory cue and the contextual cue; and
 the alarm module executes on the processor to facilitate selecting a pre-registered recipient from a plurality of potential recipients of an alert, responsive to the contextual cue, and alerting the pre-registered recipient of the emergency, via the wireless communication module, in response to identifying the emergency.

2. The apparatus of claim 1 further comprising the first sensor, wherein the first sensor is selected from the group consisting of a thermometer, a microphone, an accelerometer, a GPS receiver, a photodiode, a pulse oximeter, a sphygmomanometer, a galvanometer, and an electromyography sensor.

3. The apparatus of claim 2 further comprising a wearable sensor module to be worn by a user of the apparatus, wherein the first sensor is housed in the wearable sensor module.

4. The apparatus of claim 3 further comprising a second wireless communication module by which the processor is coupled in communication with the first sensor.

5. A method comprising:
 receiving at a processor of a cellular phone a signal indicative of detecting a contextual cue;
 receiving at the processor of the cellular phone a signal indicative of detecting a confirmatory cue;
 the processor of the cellular phone identifying an emergency in response to detecting both the confirmatory cue and the contextual cue;
 the processor of the cellular phone selecting a pre-registered recipient from a plurality of potential recipients of an alert, responsive to the contextual cue; and
 in response to identifying the emergency, the processor of the cellular phone alerting the pre-registered recipient of the emergency via a wireless communication module of the cellular phone.

6. The method of claim 5 wherein the contextual cue is a sound level.

7. The method of claim 5 wherein the contextual cue is a rate of change of a sound level.

8. The method of claim 5 wherein the contextual cue is a temperature.

9. The method of claim 5 wherein the contextual cue is a physiologic cue of a user of the cellular phone.

10. The method of claim 9 wherein the contextual cue is detected by a pulse oximeter.

11. The method of claim 9 wherein the contextual cue is detected by a galvanometer.

12. The method of claim 5 wherein the confirmatory cue is a gesture made by a user of the cellular phone.

13. The method of claim 12 wherein the confirmatory cue is detected by a sensor of a wearable item worn by the user of the cellular phone.

14. The method of claim 5, further comprising providing distinct software modules, each of the distinct software modules being embodied on a computer-readable storage medium of the cellular phone, wherein the distinct software modules comprise a contextual module, a confirmatory module, and an alarm module, wherein:
 the contextual module executes on the cellular phone to facilitate receiving a signal indicative of detecting a contextual cue;
 the confirmatory module executes on the cellular phone to facilitate receiving a signal indicative of detecting a confirmatory cue and to facilitate identifying an emergency in response to detecting both the confirmatory cue and the contextual cue; and
 the alarm module executes on the cellular phone to facilitate alerting the pre-registered recipient in response to identifying the emergency.

15. The method of claim 5 further comprising pre-registering the plurality of potential recipients of the alert.

16. A computer program product comprising a computer readable storage medium embodying computer executable instructions which when executed by a cellular phone cause the cellular phone to facilitate a method of:
 receiving a signal indicative of detecting a contextual cue;
 receiving a signal indicative of detecting a confirmatory cue;
 identifying an emergency in response to detecting both the confirmatory cue and the contextual cue;
 selecting a pre-registered recipient from a plurality of potential recipients of an alert, responsive to the contextual cue; and
 alerting the pre-registered recipient in response to identifying the emergency.

17. The product of claim 16, further embodying computer executable instructions which when executed by the cellular phone cause the cellular phone to facilitate:
 establishing wireless communication with a sensor for detecting one of the contextual cue or the confirmatory cue.

18. The product of claim 16, further embodying computer executable instructions which when executed by the cellular phone cause the cellular phone to facilitate:
 pre-registering the plurality of potential recipients of the alert.

19. The product of claim 16, further embodying computer executable instructions which when executed by the cellular phone cause the cellular phone to facilitate:
 establishing reference values of sensor values corresponding to one or more contextual cues.

20. The product of claim 16, further embodying computer executable instructions which when executed by the cellular phone cause the cellular phone to facilitate:
   establishing a confirmatory gesture input.

\* \* \* \* \*